US011632326B1

(12) United States Patent
Hegar et al.

(10) Patent No.: US 11,632,326 B1
(45) Date of Patent: Apr. 18, 2023

(54) SELECTION OF NETWORK PATHS FOR RELIABLE COMMUNICATIONS BASED ON NETWORK RELIABILITY METRICS

(71) Applicant: Amazon Technologies, Inc., Seattle, WA (US)

(72) Inventors: Ryan Hegar, Happy Valley, OR (US); Evan Statton, Denver, CO (US); Norman Bright, Portland, OR (US); Steve Andrew Orchard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/348,065

(22) Filed: Jun. 15, 2021

(51) Int. Cl.
*H04L 45/24* (2022.01)
*H04L 45/12* (2022.01)
*H04L 69/16* (2022.01)
*H04L 43/0817* (2022.01)
*H04L 45/42* (2022.01)

(52) U.S. Cl.
CPC .......... *H04L 45/24* (2013.01); *H04L 43/0817* (2013.01); *H04L 45/123* (2013.01); *H04L 45/42* (2013.01); *H04L 69/16* (2013.01)

(58) Field of Classification Search
CPC ... H04L 45/24; H04L 43/0817; H04L 45/123; H04L 69/16
See application file for complete search history.

(56) References Cited

U.S. PATENT DOCUMENTS

| | | | | |
|---|---|---|---|---|
| 2005/0243725 | A1* | 11/2005 | Wrenn | H04L 69/40 370/238 |
| 2006/0277285 | A1* | 12/2006 | Boyd | H04L 67/14 709/223 |
| 2008/0219281 | A1* | 9/2008 | Akin | H04M 11/062 370/419 |
| 2009/0190482 | A1* | 7/2009 | Blair | H04L 45/00 370/250 |
| 2010/0284275 | A1* | 11/2010 | Martinez | H04L 69/14 370/231 |
| 2012/0005372 | A1* | 1/2012 | Sarikaya | H04W 80/045 709/245 |
| 2019/0173850 | A1* | 6/2019 | Jain | H04L 9/3236 |
| 2020/0213905 | A1* | 7/2020 | Liu | H04W 76/16 |
| 2020/0275171 | A1* | 8/2020 | Cloud | H04N 21/64784 |

* cited by examiner

*Primary Examiner* — Abdulkader M Alriyashi
(74) *Attorney, Agent, or Firm* — Eversheds Sutherland (US) LLP

(57) ABSTRACT

Systems, devices, and methods are provided for transmitting and retransmitting data. A first message transmitted by a sender computing entity to a receiver computing entity over a first port may exercise a first network path whereas a second message transmitted over a second port may exercise a second network path. A system (e.g., sender computing entity) may determine network reliability metrics for a plurality of network paths. If a system detects data loss (e.g., packet loss) on a first port, a second port may be selected based on network reliability metrics for retransmission of the lost data. A port may for example, be selected for retransmission based on the following criteria: (1) the port has the longest consecutive duration without packet loss and (2) the port has received an acknowledgement for a packet that was sent more recently than the initial transmission of the lost packet.

17 Claims, 8 Drawing Sheets

SELECTION OF NETWORK PATHS FOR RELIABLE COMMUNICATIONS BASED ON NETWORK RELIABILITY METRICS

BACKGROUND

Multimedia content—for example, in the form of a video stream—may be transmitted as a stream of data packets over a network from a sender (e.g., first computing entity) to a receiver (e.g., second computing entity). In various contexts, the transmission of multimedia streams may have relatively low tolerances for delays in content, such that if a packet is not received within a certain amount of time, it is either unusable or of limited use. These packets can be routed from a sender to receiver over a large number of network paths. However, adverse network conditions (e.g., network outages) may simultaneously affect several network paths. If a failure is detected in the transmission of a data packet along a first network path, it may be difficult to ascertain whether a second network path is suitable for retransmission of the data, as it may have also been impacted by the adverse network conditions. The reliability of data (e.g., multimedia stream) being transmitted over a lossy communications channel can be improved.

Figure 1:
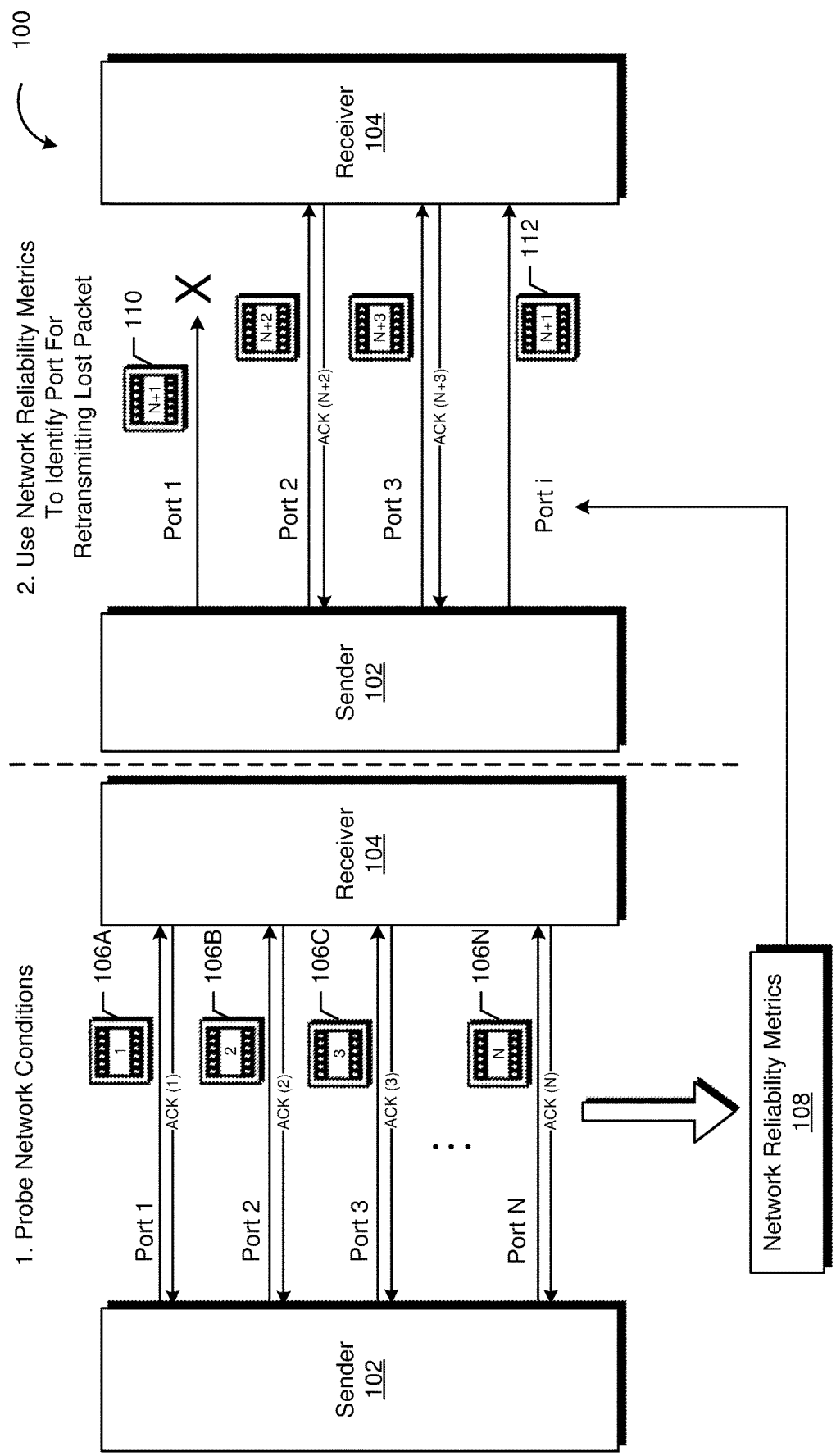
FIG. 1 illustrates a computing environment in which techniques for retransmission of lost data packets using network reliability metrics to select a reliable network path may be implemented, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for reliable delivery of multimedia content in a lossy network environment. In various embodiments, messages (e.g., network packets) are transmitted from a sender computing entity to a receiver computing entity over several network paths, and the sender replies with an acknowledgement for each successfully received message. For example, in some cases data packets carrying content (e.g., multimedia content) are transmitted over n different network paths in a round-robin fashion; in other cases, probe packets are continuously transmitted over n probe streams. As responses (e.g., ACKs) are received, the sender and receiver are able to determine which network paths are healthy, and whether packet loss is being experienced over any of the network paths being exercised. If a packet loss is detected on a first network path, a second network path may be intelligently selected based on information collected regarding the current network conditions of various potential network paths. In at least one embodiment, packet loss is detected on a first network path and a second network path is selected for retransmission of the contents of the packet based on two criteria: first, that another packet was successfully acknowledged on the second network path subsequent to the initial transmission of the lost packet and second, that the second network path has the longest consecutive duration without packet loss, among the network paths that satisfy the first criterion. Variations upon how retransmission paths and ports may be selected are described in greater detail below, for example, in connection with FIGS. 1, 6, and 8.

In at least one embodiment, a packet retransmission strategy may be implemented by using a fixed, but large number of source ports (e.g., n=100) and apply different algorithms to choose which ports it sends a packet on based on how many attempts to send the packet have been previously made. Transmitting packets over different ports may be a technique that is utilized to explore the availability of different network paths for sending data. In various embodiments, the network path for sending a packet is determined based on a tuple of information comprising (1) source port; (2) source address; (3) receiver port; (4) receiver destination; and (5) protocol. The tuple may be encoded in the header of a packet, and may be provided as an input to a hash function to produce an output that is used to determine a network path for transmission of the packet. In this way, and according to at least one embodiment, the network paths used to transmit various packets may be altered by specifying different source ports for transmission of such packets.

Continuing with this example, delivery of data (e.g., the process by which data is transmitted and possibly retransmitted so that the data is received by a destination) may be performed in two modes of operation. The first mode may be referred to as a discovery mode. In the first mode, packets are sent over a large number of ports (e.g., n ports) in a round-robin fashion such that a first packet is sent over a first port, a second packet is sent over a second port, etc. By sending packets over different ports, different network paths may be exercised. Some or all of the packets may be received by a receiver computer system on one or more ports, which may be different from the ports that the sender computer system used to transmit the packets. For a packet that is received within an expected time internal, receiver computer system may transmit an acknowledgement (e.g., ACK) to the sender computer system indicating successful receipt of the packet. As a result of transmitting packets over n ports, data may be constantly collected on the effectiveness of the n possible network paths based on which messages were successfully acknowledged. It is noted that in this first mode, an affinity for reliable network paths may not be known a priori and the transmission of data packets over each of the n ports may exercise a subset of network paths that are affected by adverse network conditions. However, responses received over the exercised network paths may provide the raw data used to improve the likelihood of success for subsequent packet retries performed using techniques in the second mode of operation.

A second mode of operation may use metrics collected in the first mode of operation that provide information as to the condition of a network infrastructure to determine how to retransmit lost data packets. The second mode may be referred to as a retry mode. If a first attempt to send a data packet fails, subsequent attempts to send the contents (e.g., retransmissions) may be made according to the second mode of operation. In at least one embodiment, the second mode of operation is used to transmit data packets (e.g., retries) using information collected regarding the network conditions of various potential network paths.

In an illustrative example, a first data packet comprising first content is transmitted using a first port. A first network path may be selected for transmission of the first network packet, wherein the first network path is determined based at least in part on the first port. A failure may occur in transmission of the first data packet from a sender computing entity to a receiver computing entity. In response to such a failure, one or more retransmission attempts may be made according to the second mode of operation. A second port for retransmission of the first content may be selected based on information collected regarding the network conditions of various potential network paths. Information regarding network conditions may have been collected from the first mode of operation. For example, as packets are sent over different ports corresponding to different network paths, acknowledgements sent by a receiver computing entity to a sender computing entity may be collected by the sender computing entity to build a list of ports (and associated network paths) that are working properly. A lack of an acknowledgement within a maximum round trip time (RTT) and/or a negative acknowledgement (e.g., NACK) may also be used to positively identify ports (and associated network paths) that are not working properly. In some embodiments, the sender computing entity maintains a list or other suitable data structure for each supported port and/or network path in connection with network conditions for the port. Such network conditions may include metrics for how many consecutive packets have been successfully sent over the port, a duration for how long the port has been used to successfully transmitted packets without loss, an ongoing error rate for the port that is measured over a recent time window, and so on.

Current and/or recent network conditions for network paths may be evaluated to determine a suitable path for retransmitting a lost packet. A lost packet that was initially transmitted over a first network path (e.g., using a first port) may be retransmitted by selecting a second port based on current and/or recent network conditions and retransmitting the packet using the second port. A second port for retransmission is selected based on a set of criteria associated with current and/or recent network conditions, according to at least one embodiment. For example, a retransmission port may be selected as the port with the longest consecutive duration without packet loss and that the port has successfully received an acknowledgement for a packet that was sent before the first transmission of the lost packet. In at least one embodiment, the second through N-th attempts to send a packet use the source port that has the longest consecutive duration without packet loss and which has received an ACK for a packet that was sent more recently than when the packet to be retried was first sent.

A failure may occur in transmission of the first data packet from a sender computing entity to a receiver computing entity. An example of such a failure may be that the first data packet was lost during transmission of the first data packet from the sender to the receiver at some point in the first network path. As a second example, the data packet may be delayed during transmission such that it arrives at the receiver computing entity after a threshold duration. The threshold duration may be based on a buffer size or buffer duration that is supported by the receiver computer system for assembling various data packets into a multimedia stream or other related content. For example, if a receiver computer system allocates a 2-second buffer for a multimedia stream, a data packet should be transmitted (e.g., multiple times, if needed) and successfully received by the receiver computer system within two seconds to be released as part of an output stream generated by the buffer.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates a computing environment 100 in which techniques for retransmission of lost data packets using network reliability metrics to select a reliable network path may be implemented, in accordance with one or more example embodiments of the present disclosure. In at least one embodiment, sender 102 transmits content to receiver 104. Content may be transmitted in the form of data packets, which are routed from sender 102 to receiver 104 based at least in part on the sender ports specified in the data packets. A data packet may refer to a User Datagram Protocol (UDP) datagram, a Transmission Control Protocol (TCP) segment or packet, or various other types of messages.

Sender 102 may refer to a first computing entity and may be a machine or set of several machines operating in conjunction with each other. In various embodiments, sender 102 comprises network interface implemented as hardware, software, or a combination thereof, that is used to transmit and/or receive data over a network backbone. Sender 102 may transmit messages to receiver 104 using various protocols including but not limited to: using various protocols including but not limited to: UDP, TCP, DCCP, SCTP, QUIC, RSVP, and more. Sender 102 may refer to a computing entity that transmits multimedia content (e.g., multimedia stream) to receiver 104. Sender 102 may receive acknowledgements (ACKs) indicating that packets (e.g., including segments of multimedia content or portions thereof) were successfully received.

Receiver 104 may refer to a second computing entity and may be a machine or set of several machines operating in conjunction with each other. For example, receiver 104 may receive messages (e.g., transmitted by sender 102) using various protocols including but not limited to: UDP, TCP, DCCP, SCTP, QUIC, RSVP, and more.

Figure 3:
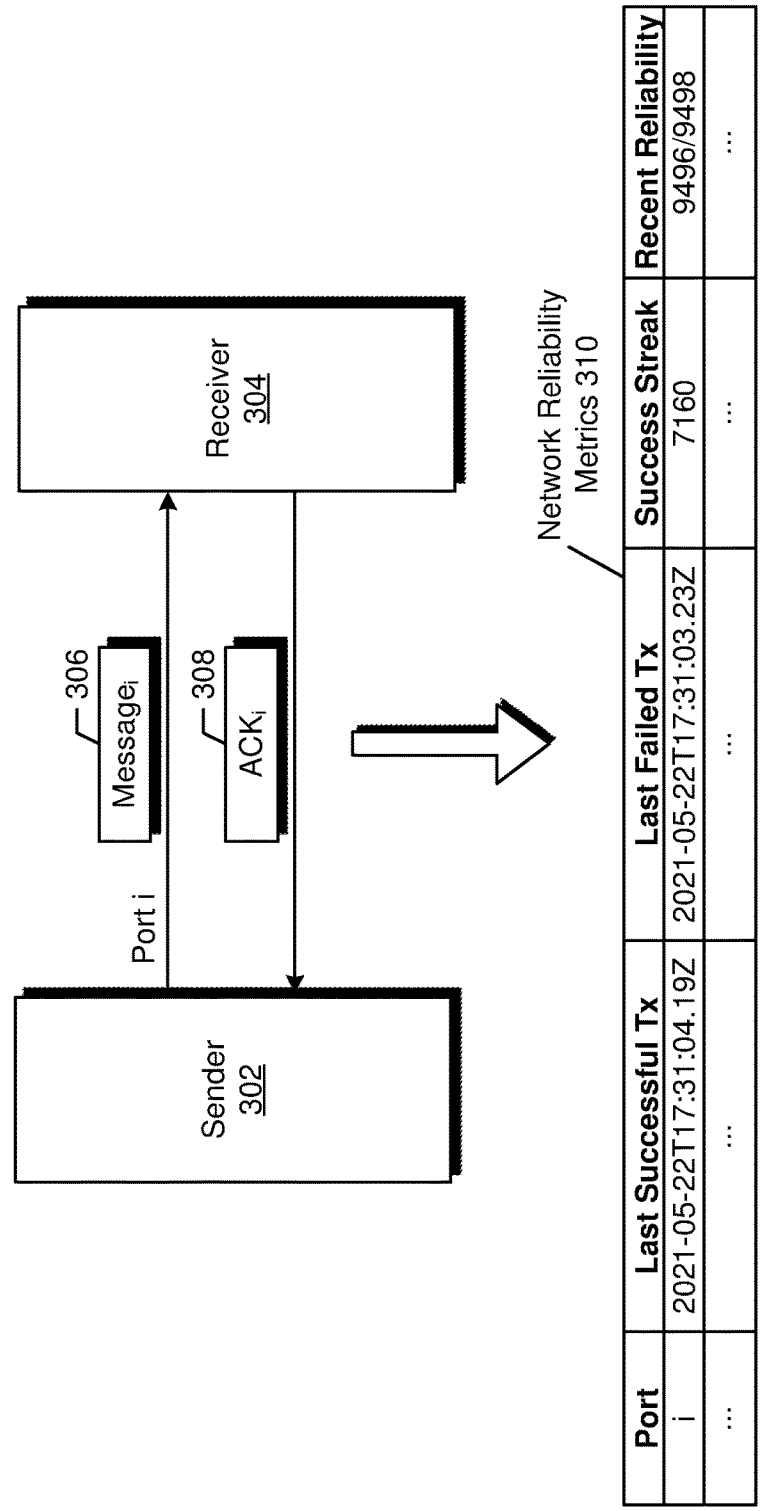
FIG. 3 illustrates a computing environment in which network reliability metrics are collected, in accordance with one or more example embodiments.

Messages 106A-N may be implemented according to protocols at different layers of the Open Systems Interconnection (OSI) model—for example, a message may be implemented according to both a network-layer protocol (e.g., layer 3 of OSI model) and transport-layer protocol (e.g., layer 4 of OSI model). Receiver 104 may refer to a computing entity that receives multimedia content (e.g., multimedia stream) transmitted by sender 102 to receiver 104 via a network backbone. In at least one embodiment, messages 106A-N illustrated in FIG. 3 are User Datagram Protocol (UDP) datagrams. Messages 106A-N may carry content, for example, multimedia content. Message 106A may comprise first content, message 106B second content, message 106C third content, and so on. In various embodiments, different portions of content are transmitted over different ports, thereby exercising multiple network paths and reducing the possibility that a single point of failure in the network backbone will cause a failure to the entire content stream.

Sender 102 may transmit messages 106A-N to receiver 104. Receiver 104 may receive messages 106A-N and transmit corresponding acknowledgements (ACKs) encoding identifiers of the packets and/or contents that were successfully received. Successful receipt of a packet may include various criteria, including but not limited to the packet being received within a predetermined period of time (e.g., delivery of packet after the predetermined period of time may be unacceptable), data integrity checks passing on the data (e.g., verifying a datagram or message checksum), and more. In various embodiments, sender 104 senders negative acknowledgements (NACKs) indicating when a packet that was expected to be received by a certain period of time has not been received, which may be due to a variety of reasons including but not limited to the packet being lost or delayed in transmission.

In various embodiments, sender 102 records network reliability metrics 108. Network reliability metrics 108 may be stored in a database table, as a data structure in memory, and so on. Network reliability metrics may refer to information relating to the condition of a network path associated with a particular tuple or sender port information. One or more reliability metrics may be recorded for each port that is used for network communications between sender 102 and receiver 104. In at least one embodiment, network reliability metrics 108 includes a row for each port being exercised in transmission between sender 102 and receiver 104. One or more metrics of network reliability may be recorded in connection with one or more ports being used for communications between sender 102 and receiver 104. For example, if message 106A is transmitted over port 1, various aspects of the communication may be recorded as network reliability metrics. For example, message 106A may be transmitted over port 1 at time $t_1$ and successfully received by receiver 104 at time $t_2$. In response to receiving message 106A, receiver 104 may transmit an ACK at time $t_3$ and sender 102 may receive the ACK at time $t_4$. One or more of these times may be recorded as network reliability metrics. For example, sender 102 may record $t_1$ as the time of the last (e.g., most recent) successful message transmission in response to receiving an ACK. In some embodiments, the last (e.g., most recent) failed message transmission is recorded in network reliability metrics 108. If the most recent failed transmission over a port is later in time (e.g., more recent) than the most recent successful transmission over the same port, it indicates that the most recent attempt to transmit a message over the port failed and that the network path associated with the port may be subject to an adverse condition or otherwise impaired. Network reliability metrics may be collected and recorded in accordance with techniques described in connection with FIG. 3.

In some embodiments, network reliability metrics 108 are utilized to identify a port for retransmitting a lost packet.

For example, sender 102 may transmit messages 106A-N to receiver 104 in a round-robin fashion as part of a first mode of operation (e.g., discovery) wherein the network conditions for ports 1, 2, . . . , N are ascertained and recorded as network reliability metrics 108. In some embodiments, sender 102 will, upon reaching the $N^{th}$ port, continue subsequent transmissions by looping around and transmitting the $N+1^{th}$ data packet on port 1, $N+2^{th}$ data packet on port 2, and so on, assuming that the initial transmissions over those ports were successful. Ports that were not successfully ACK'd during discovery may be excluded from subsequent use, at least temporarily. For the sake of example, FIG. 1 illustrates the $N+1^{th}$ data packet transmitted on port 1 was not received, whereas and $N+2^{th}$ data packet transmitted on port 2 and $N+3^{th}$ data packet transmitted on port 3 are successfully received by receiver 104 and ACKs for the successfully received packets successfully received by sender 102. Assume, additionally, that the $N+2^{th}$ data packet and $N+3^{th}$ data packet were both transmitted subsequent to the $N+1^{th}$ data packet.

Continuing with an example in accordance with FIG. 1, port 1 may be used to transmit the $N+1^{th}$ data packet 110. However, transmission of this data packet 110 may fail. For example, receiver 104 may not receive the data packet 110 and fail to send an ACK to sender 102 indicating that the packet was received. In some cases, receiver 104 waits a period of time and sends back a NACK when the period of time has elapsed without receiving data packet 110 Accordingly, packet loss may be detected for data packet 110.

Sender 102 may utilize network reliability metrics 108 to identify a port for retransmitting the lost packet. In at least one embodiment, the criteria for selecting a retransmission port are: (1) the source port that has the longest consecutive duration without packet loss and (2) such source port has received an ACK for a packet that was sent more recently than when the packet to be retried was first sent. In FIG. 1, the second criterion may be satisfied by both port 2 and port 3 based on the assumption stated above that $N+2^{th}$ data packet and $N+3^{th}$ data packet were both transmitted subsequent to the $N+1^{th}$ data packet as well as being ACK'd. These ports may be considered candidate ports. Among the candidate ports, network reliability metrics 108 may be used to identify which port has a longer consecutive duration without packet loss. In some embodiment, such as those discussed in connection with FIGS. 3 and 4, other techniques may be used to select a suitable retransmission port, denoted as "Port i" in FIG. 1.

In at least one embodiment, a retry data packet 112 may be transmitted by sender 102 to receiver 104. In at least some embodiments, the data payload of data packet 112 are identical to the data payload of data packet 110. In at least one embodiment, the sender port for retry data packet 112 is selected from a list of candidate ports. By a different port to transmit retry data packet 112, a different network path may be exercised in the transmission, and by selecting the sender port in a manner that utilizes network reliability metrics 106, sender 102 may intelligently select a sender port that is more likely to succeed, based on current/recent network conditions.

Variations on the techniques described above may be considered, and may be discussed in greater detail below, such as in connection with FIGS. 5 and 7.

In various embodiments, content being transmitted from sender 102 to receiver 104 is time-sensitive. The content may, for example, be multimedia content wherein receiver 104 has a limited buffer (e.g., in terms of size or duration) and receiver 104 may be forced to release the buffer when it is full. Various systems described herein may be designed around two constraints—first, a maximum end-to-end latency time, which may refer to the limit for how long receiver 104 can wait to receive a data packet from sender 102; and second, a maximum round-trip time (RTT) for which an individual packet may take to be acknowledged. For example, if the maximum end-to-end latency time is 2 seconds and RTT is 400 milliseconds, such a communications system may allow for up to 5 attempts to transmit a data packet (e.g., 2 seconds (2000 msec) divided by 400 msec). The end-to-end latency time and RTT may be configured based on the network being used to by sender 102 and receiver 104. For example, end-to-end latency of 2 seconds and RTT of 400 msec may be suitable for cross-region traffic, but shorter durations may be used for intra-region traffic. In some cases, the same end-to-end latency may be used for both cross-region and intra-region traffic. In some embodiments, RTT time may be measured and end-to-end latency time may be configured based on network conditions to accommodate for more potential retries if network conditions are poor and fewer retries if network conditions are favorable.

In various embodiments, the rate at which the round-robin use of source ports provides new data about successful paths may be considered The amount of new data available between For example, consider the following table below, showing the duration in milliseconds (msec) before packet data is refreshed for 100 unique source ports as a function of the bitrate (e.g., assuming a typical packet size for transport streams):

| Bitrates (Mbps) | Packets Per Second | Duration for 100 Packets in Msec |
| --- | --- | --- |
| 1 | 95 | 1053 |
| 2.632 | 250 | 400 |
| 10 | 9850 | 105 |
| 50 | 4749 | 21 |
| 100 | 9498 | 11 |

For cross-region traffic, it may be suitable to configure 2 second end-to-end latency which corresponds to a 400 msec RTT. All 100 source ports may be re-sued in one RTT if the bitrate is greater than 2.632 Mbps. Consider an example in which the first packet dropped after a new network event is detected—at that point in time, the available data about source port reliability for the second packet sent may be somewhat stale due to much of the network reliability data reflecting traffic ACK'd prior to the network event (e.g., even though for this first impacted packet some packets sent after this packet may have been successfully ACK'd before the retry timeout for the current packet expires) but if the second packet sent also fails then by the time this packet is sent a third time, the network reliability metrics will have been updated for every source port showing whether they delivered packets successfully. For intra-region traffic, the network RTT may be much lower than for cross-region traffic and the retry interval may be as low as 20 msec. For example, with a retry interval of 20 msec and a bitrate of 10 Mbps, new data on about 21 flows per retry interval may be collected.

Figure 2:
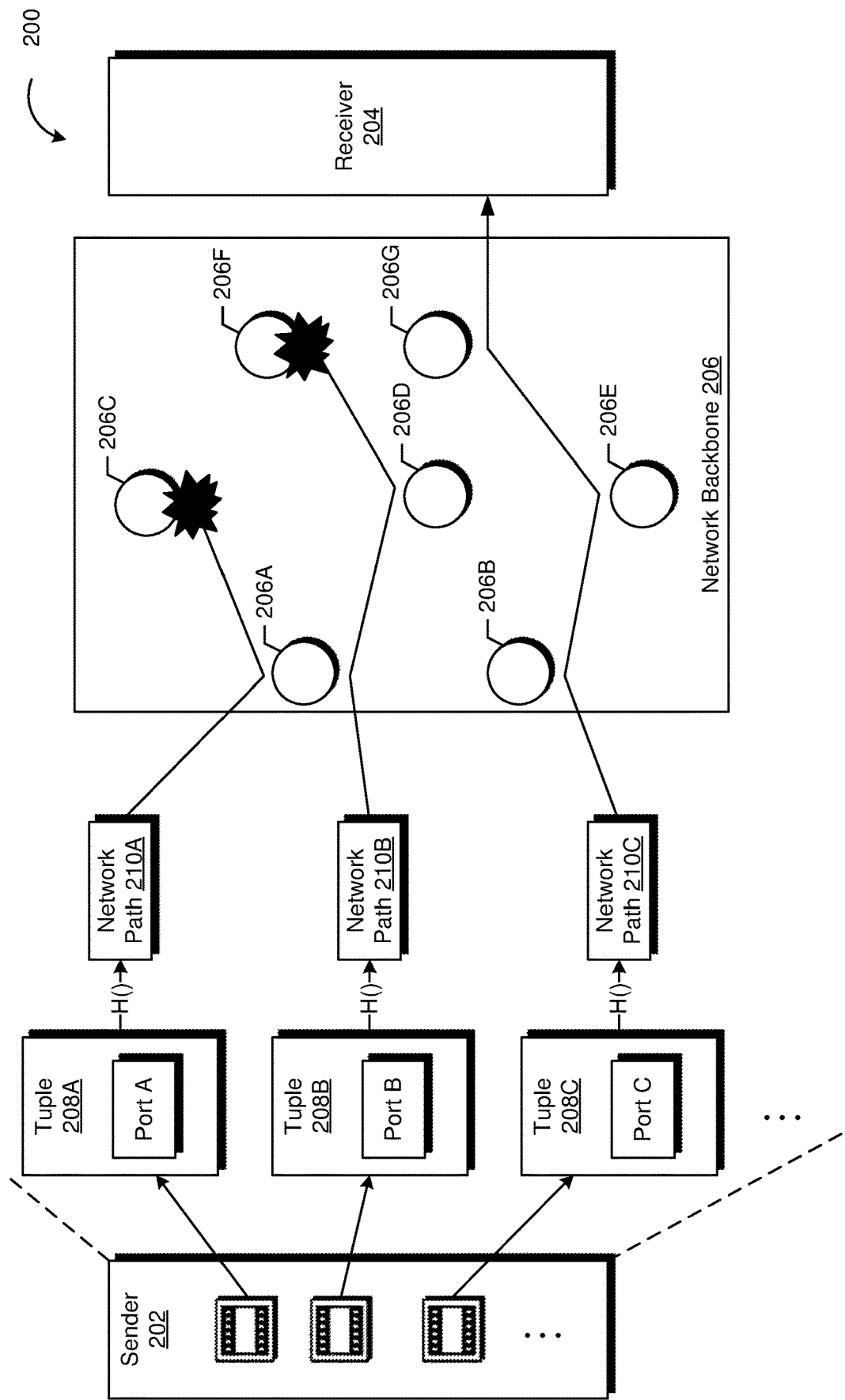
FIG. 2 illustrates a computing environment in which retransmission techniques described herein may be utilized to avoid adverse network conditions, in accordance with one or more example embodiments of the present disclosure.

FIG. 2 illustrates a computing environment 200 in which retransmission techniques described herein may be utilized to avoid adverse network conditions, in accordance with one or more example embodiments of the present disclosure. In at least one embodiment, sender 202 transmits data to a receiver 204 using network backbone 206, which may be subject to adverse network conditions. Examples of adverse network conditions include but are not limited to failures in routing nodes, failures in physical communications channels (e.g., damaged fiber optic cable), and more. In various examples described herein, portions of network backbone 206 are subject to adverse conditions such that some network paths between sender 202 and receiver 204 are broken but others are still working.

Sender 202 may refer to a first computing entity, and may furthermore be implemented in accordance with various computing entities described throughout this disclosure, such as those discussed in connection with FIGS. 1, 6, 7, and 8. Sender 202 may be a machine or set of several machines operating in conjunction with each other. In various embodiments, sender 202 comprises network interface implemented as hardware, software, or a combination thereof, that is used to transmit and/or receive data over network backbone 206. Sender 202 may refer to a computing entity that transmits multimedia content (e.g., multimedia stream) to receiver 204 via network backbone 206. Sender 202 may receive acknowledgements (ACKs) indicating that packets (e.g., including segments of multimedia content or portions thereof) were successfully received.

Receiver 204 may refer to a second computing entity, and may furthermore be implemented in accordance with various computing entities described throughout this disclosure, such as those discussed in connection with FIGS. 1, 6, 7, and 8. Receiver 204 may be a machine or set of several machines operating in conjunction with each other. For example, receiver 204 may receive messages (e.g., transmitted by sender 202) using various protocols including but not limited to: UDP, TCP, DCCP, SCTP, QUIC, RSVP, and more. A message may be implemented according to protocols at different layers of the Open Systems Interconnection (OSI) model—for example, a message may be implemented according to both a network-layer protocol (e.g., layer 3 of OSI model) and transport-layer protocol (e.g., layer 4 of OSI model). Receiver 204 may refer to a computing entity that receives multimedia content (e.g., multimedia stream) transmitted by sender 202 to receiver 204 via network backbone 206. Receiver 204 may receive, via network backbone 206, a packet (e.g., segment of multimedia content or portion thereof) and transmit an acknowledgement (ACK) encoding an identifier of the packet and/or content and an indication that it was successfully received. Successful receipt of a packet may include various criteria, including but not limited to the packet being received within a predetermined period of time (e.g., delivery of packet after the predetermined period of time may be unacceptable), data integrity checks passing on the data (e.g., verifying a datagram or message checksum), and more. In various embodiments, receiver 204 senders negative acknowledgements (NACKs) indicating when a packet that was expected to be received by a certain period of time has not been received, which may be due to a variety of reasons including but not limited to the packet being lost or delayed in transmission.

Network backbone 206 may refer to computer network infrastructure that interconnects sender 202 and receiver 204. In some embodiments, sender 202 and receiver 204 are computing entities located in diverse geographic regions and interconnected via network backbone 206. Network backbone 206 may comprise gateways, routers, switches bridges, and other networking infrastructure. Network backbone 206 may be used to connect public networks (e.g., Internet) or private networks (e.g., intranet or enterprise network) of computing entities.

FIG. 2 illustrates an example network backbone with various nodes 206A-G corresponding to network infrastructure used to route and deliver messages, according to at least one embodiment. In an illustrative example, network backbone 206 may be subject to an adverse event, such as a local or regional outage that affects nodes of network backbone 206 that are used to facilitate network communications. FIG. 2 illustrates an example in which nodes 206C and 206F are subject to an adverse network condition and are not able to successfully receive and/or forward messages. The adverse network condition that caused the failures to 206C and 206F may be the same or related events (e.g., an ongoing power outage affecting a geographical region where 206D and 206F are located) or unrelated.

In at least one embodiment, messages transmitted by sender 202 are routed using a network path that is defined or otherwise determined using a tuple of information encoded in the message. For example, a 5-tuple of a packet comprising {source port; source address; destination port; destination address; protocol} may form the basis of a tuple. The tuple may be provided as an input to a hash function that generates a hash output, and the hash output may be used to determine a specific network path. The determined network path is used to route the packet, according to at least one embodiment.

FIG. 2 depicts an illustrative example in which sender 202 transmits message to receiver 204 over different ports, which may be used to control or influence which network paths are used in the transmission of the packets from sender 202 to receiver 204. For example, sender 202 may generate a first UDP datagram and sender the first UDP datagram over Port A. Port A may be symbolic of any suitable port number for transmitting data from sender 202 to receiver 204. A first tuple 208A of information may be determined for the first UDP datagram, which include the following 5-tuple:

| Example 5-Tuple For First Tuple 208A | |
| --- | --- |
| Tuple Field | Tuple Value |
| Sender Port | 2345 |
| Sender Address | 165.160.13.20 |
| Destination Port | 5432 |
| Destination Address | 205.251.242.103 |
| Protocol | 0x11 (UDP) |

A tuple such as tuple 208A may include a set of fields that comprises a sender port. Sender port may correspond to the port over which sender 202 sends a message. Sender address may refer to the IP address (e.g., according to IPv4 or IPv6) of sender 202. Destination port may correspond to the port over which receiver 204 is to receive the message. Destination address may refer to the IP address (e.g., according to IPv4 or IPv6) of receiver 204. Protocol may refer to an identifier that encodes the encapsulated protocol of the message. The protocol may be encoded according to a protocol number listing as maintained by a standards body, such as the Internet Assigned Numbers Authority (IANA). A second tuple 208B of information may, except for the sender port, be identical to first tuple 208A in all other respects:

| Example 5-Tuple For Second Tuple 208B | |
| --- | --- |
| Tuple Field | Tuple Value |
| Sender Port | 3456 |
| Sender Address | 165.160.13.20 |
| Destination Port | 5432 |
| Destination Address | 205.251.242.103 |
| Protocol | 0x11 (UDP) |

In at least one embodiment, tuple 208A comprises a first port and is provided as an input to a hash function. Tuple 208A may be converted or otherwise formatted to accommodate the input format of the hash function. A hash function as described herein may refer to an example of a type of one-way function. The hash function may generate, as an output, an output that is one-way or effectively one-way. Hash output may be mapped to different network paths that indicate how a message should be routed through network backbone 206. In this way, messages can be routed via network backbone 206 over a plurality of network paths by sending the messages over different sender ports.

In some embodiments, the destination port may be altered to exercise different network paths. In at least one embodiment, receiver 204 comprises executable code that, as a result of execution, causes the receiver 204 to monitor a set of ports for receiving data packets from sender 202. The set of ports that receiver 204 monitors may be mutually determined by sender 202 and receiver 204 during a handshake process or by one or more control packets. For example, sender 202 may send a message to receiver 204 with a list of destination ports that may be used by sender 202 to transmit packets to receiver 204 and receiver 204 may send an acknowledgement that the list of destination ports specified by sender 202 may be used. An example alternative to the 5-tuple for second tuple 208B depicted in the table above may be in accordance with the following:

| Alternative Example 5-Tuple For Second Tuple 208B | |
| --- | --- |
| Tuple Field | Tuple Value |
| Sender Port | 2345 |
| Sender Address | 165.160.13.20 |
| Destination Port | 4321 |
| Destination Address | 205.251.242.103 |
| Protocol | 0x11 (UDP) |

A first source port may hash to a first network path and a second source port may hash to a second network path. In some embodiments, there is a small but non-zero probability of a hash collision that results in the first source port and the second source port hashing to the same network path. In some embodiments, a sufficiently low probability of a hash collision causing the same network path to be used by two different ports is acceptable.

FIG. 2 depicts an illustrative example in which sender 202 may use different ports to influence the network paths that are exercised in transmission of packets from sender 202 to receiver 204. For example, FIG. 2 illustrates tuple 208A, tuple 208B, and tuple 208C, may be extracted from three different UPD datagrams that are being sent over three different ports, Port A, Port B, and Port C. Ports A-C may be symbolic of different sender port numbers. The datagrams may correspond to successive portions of a multimedia stream from times $t_1$–$t_2$, $t_2$–$t_3$, $t_3$–$t_4$. Sender 202 may transmit datagrams in succession to each other without waiting to receive acknowledgements (e.g., all three packets are transmitted prior to determining whether first packet was successfully received). Continuing with this illustrative example, tuples 208A, 208B, and 208C may be extracted and used as inputs to a common hash function depicted as H( ) in FIG. 2. The outputs of the hash function may be different for each tuples 208A, 208B, and 208C. Each of these distinct hash output may be mapped to a different network path 210A, 210B, and 210C. For example, first network path 210A may map to a first network path ACF (e.g., first datagram is to be routed to receiver 204 via nodes 206A, 206C, and 206F), second network path 210B may map to second network path ADF, and third network path 210C may map to third network path BEG. Messages transmitted over network path BEG may be successful, whereas those that attempt to utilize nodes C and F (e.g., network paths 210A, 210B, and others) may fail.

Continuing with this example, adverse network conditions may affect nodes 206C and 206F such that messages routed to those nodes are not forwarded, resulting in transmission failures and lost messages when those nodes are used. Adverse network conditions may occur unexpectedly. Receiver 204 may receive third datagram sent over Port C, but fail to receive first and second datagrams sent over Ports A and B due to the failures in nodes 206C and 206F.

In at least one embodiment, sender 202 receives an acknowledgement for the third UDP datagram sent over network path 210C and sender 202 records the successful acknowledgement in a table of network reliability metrics. The network reliability metrics may include when the last successfully ACK packet was received on a port, a running tally of how many consecutive packets have been received over the port, and so on. Examples of network reliability metrics are described in greater detail elsewhere, such as those discussed in connection with FIG. 3. Sender 202 may also determine that the first and second UDP datagrams were lost—this determination may be made by receipt of a NACK from receiver 204, determining that an ACK was not received within a maximum round trip time, etc. Upon determining that packet loss occurred for a datagram, the sender may attempt a retransmission. Retransmission may refer to attempting to send a subsequent packet with the same contents as the lost packet. In some embodiments, sender 202 may perform one or more retries using the same port (e.g., in cases where network reliability is generally high, indicating that the failure over port A may have been transient and that retransmission over the same port may succeed). However, such need not be the case, and in various embodiments, sender 202 may select a different port for retransmission based on collected network reliability metrics.

In at least one embodiment, sender 202 uses collected network reliability metrics to determine which port to use for retransmission. In at least one embodiment, third datagram associated with network path 210C is transmitted after the initial transmission of first datagram over network path 210A, an ACK is received for third datagram, and network reliability metrics for network path 210C are recorded. A NACK or other information may be used to determine packet loss occurred for the first UDP datagram. In at least one embodiment, a port is selected for retransmission of the first UDP datagram based on the following: first, determine all ports over which a successful ACK was received for a packet that was transmitted subsequent to the initial try for the first UDP datagram (e.g., this may include the third datagram sent over network path 210C as well as other datagrams not shown in FIG. 3); second, from these determined ports, select the port with the highest consecutive number of ACKs. Once a port has been selected, for example, using the two-step technique described above, retransmission of the lost packet may be performed using the selected port. The two-step process described above may be conceptualized as identifying two aspects of network reliability: first, filtering a set of candidate ports to identify those ports which have emitted recent indications of reliability; and second, using aggregate metric to select a particular port from the filtered set based on statistical measures of reliability. Various techniques may be used to select a suitable port for retransmission of lost messages, including those described elsewhere in disclosure, for example in connection with FIGS. 6 and 7.

FIG. 3 illustrates a computing environment 300 in which network reliability metrics are collected, in accordance with one or more example embodiments of the present disclosure. In at least one embodiment, sender 302 transmits data to a receiver 304 using network infrastructure that may be subject to adverse network conditions.

Sender 302 may refer to a first computing entity, and may furthermore be implemented in accordance with various computing entities described throughout this disclosure, such as those discussed in connection with FIGS. 1, 2, and 4-8. Sender 302 may be a machine or set of several machines operating in conjunction with each other. In various embodiments, sender 302 comprises network interface implemented as hardware, software, or a combination thereof, that is used to transmit and/or receive data using network infrastructure. Sender 302 may refer to a computing entity that transmits multimedia content (e.g., multimedia stream) to receiver 304 via a network backbone.

Receiver 304 may refer to a second computing entity, and may furthermore be implemented in accordance with various computing entities described throughout this disclosure, such as those discussed in connection with FIGS. 1, 2, and 4-8. Receiver 304 may be a machine or set of several machines operating in conjunction with each other. For example, receiver 304 may receive messages (e.g., transmitted by sender 302) using various protocols including but not limited to: UDP, TCP, DCCP, SCTP, QUIC, RSVP, and more. Receiver 304 may refer to a computing entity that receives multimedia content (e.g., multimedia stream) transmitted by sender 302 to receiver 304 via a network backbone.

In various embodiments, sender 302 transmits message 306 to receiver 304. Message 306 may be any suitable type of message—for example, a UDP datagram—and may be transmitted to receiver 304 over a sender port. The sender port i may be selected from a set of n ports (e.g., $port_1$, $port_2$, . . . $port_n$) in a round-robin fashion wherein a first message is sent over $port_1$, second message is sent over $port_2$, $n^{th}$ message is sent over $port_n$, $n+1^{th}$ message is sent over $port_1$, $n+2^{th}$ message is sent over $port_2$, and so on. Message 306 may be a data packet (e.g., encoding content) or a probe packet (e.g., used for diagnosing and determining network reliability).

For example, message header of message 306 may encode a tuple of information comprising the sender port that is used to determine a network path for routing message 306 from sender 302 to receiver 304. The network path may be determined by hashing the tuple of information and mapping the hash output to a corresponding network path, for example, in accordance with one or more embodiments discussed in connection with FIG. 2.

In at least one embodiment, message 306 is successfully transmitted from sender 302 to receiver 304. Successful transmission of message 306 may involve receiver 304 receiving message 306 within a predetermined window of time. For example, receiver allocates a 2-second buffer for a multimedia stream, a message comprising content for the multimedia stream should be transmitted (e.g., multiple times, if needed) from sender 302 and successfully received by receiver 304 within two seconds to be released as part of an output stream generated by the buffer. Upon successful receipt of message 306, a corresponding acknowledgement (e.g., ACK 308) may be transmitted by receiver 304 to sender 302. Successful receipt of ACK 308 by the sender 302 indicates to the sender that message 306 was successfully received, and that retransmission is not required.

In various embodiments, sender 302 records network reliability metrics 310. Network reliability metrics 310 may be stored in a database table, as a data structure in memory, and so on. One or more reliability metrics, including one or more of those depicted in FIG. 3, may be recorded for each port that is used for network communications between sender 302 and receiver 304. In at least one embodiment, network reliability metrics 310 includes a row for each port being exercised in transmission between sender 302 and receiver 304. One or more metrics of network reliability may be recorded in connection with one or more ports being used for communications between sender 302 and receiver 304. For example, if message 306 is transmitted over port i, various aspects of the communication may be recorded as network reliability metrics. For example, message 306 may be transmitted over port i at time $t_1$ and successfully received by receiver 304 at time $t_2$. In response to receiving message 306, receiver 304 may transmit ACK 308 at time $t_3$ and sender 302 may receive the ACK 308 at time $t_4$. One or more of these times may be recorded as network reliability metrics. For example, sender may record $t_1$ as the time of the last (e.g., most recent) successful message transmission in response to receiving ACK 308. In some embodiments, the last (e.g., most recent) failed message transmission is recorded in network reliability metrics 310. If the most recent failed transmission over a port is later in time (e.g., more recent) than the most recent successful transmission over the same port, it indicates that the most recent attempt to transmit a message over the port failed and that the network path associated with the port may be subject to an adverse condition or otherwise impaired. Times and timestamps referred to herein may be stored in any suitable format, such as an absolute time or relative time. Dates and times may be encoded according to ISO 8601 format.

Various network reliability metrics may be recorded in a table of network reliability metrics 310. In some embodiments, timestamps are recorded to indicate when the last successful transmission was sent (or ACK'd) and when the last failed transmission was sent (or NACK'd). In some embodiments, a current streak of consecutive successful transmissions over a port is recorded. For example, FIG. 2 depicts that the last 7160 transmissions (excluding pending transmissions) were successful and implies that the 7161st transmission failed. In some embodiments, the success streak is time bound and only counts transmissions within a recent time window (e.g., past second). In some embodiments, a recent reliability metric records the number of successes and failures over a port over a recent window of time. The combination of the successes and failures can be used to determine a reliability percentage for the port. For example, recent reliability depicted in FIG. 3 may be for a system wherein sender and receive communicate at a bitrate of 100 Mbps (e.g., 9498 packets per second) and recent reliability measures the success rate of packets sent over the past second. As another example, recent reliability depicted in FIG. 3 may be for a system wherein sender and receive communicate at a bitrate of 50 Mbps (e.g., 4749 packets per second) and recent reliability measures the success rate of packets sent over the past two seconds.

Figure 4:
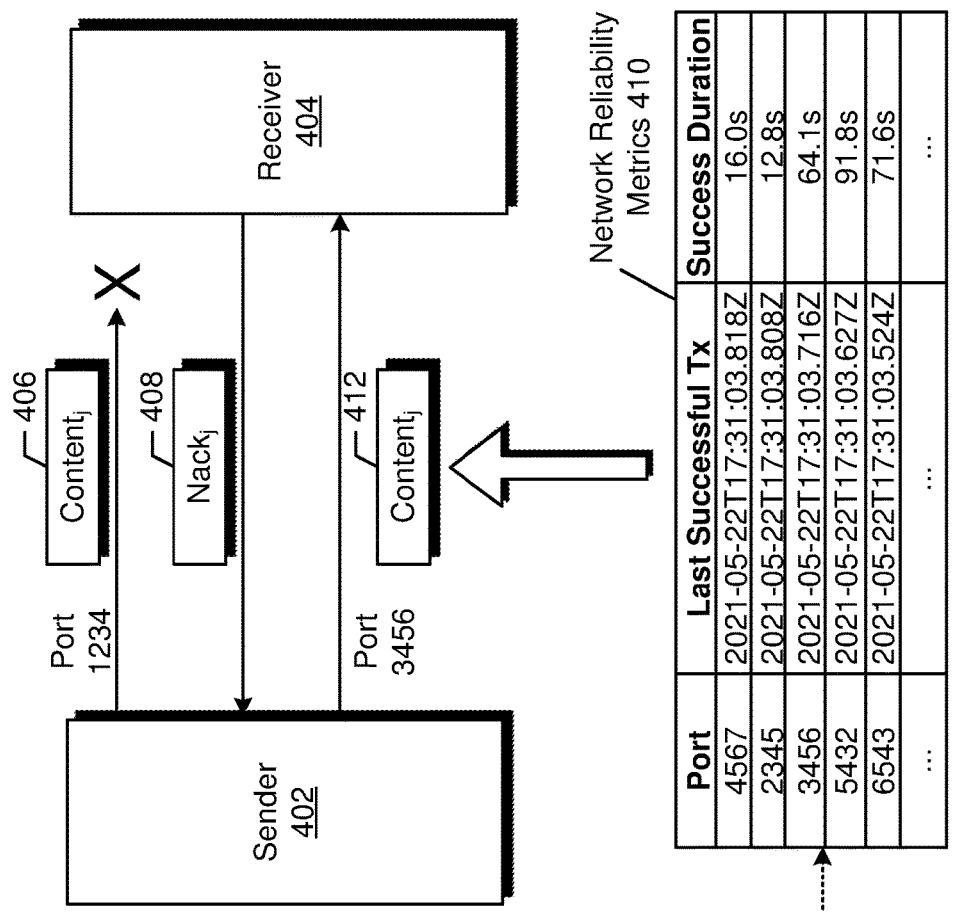
FIG. 4 illustrates a computing environment in which data is retransmitted based on network reliability metrics, in accordance with one or more example embodiments of the present disclosure.

FIG. 4 illustrates a computing environment 400 in which data is retransmitted based on network reliability metrics, in accordance with one or more example embodiments of the present disclosure. In at least one embodiment, sender 402 transmits data to a receiver 404 using network infrastructure that may be subject to adverse network conditions.

Sender 402 may refer to a first computing entity, and may furthermore be implemented in accordance with various computing entities described throughout this disclosure, such as those discussed in connection with FIG. 1-3 or 5-8. Sender 402 may be a machine or set of several machines operating in conjunction with each other. In various embodiments, sender 402 comprises network interface implemented as hardware, software, or a combination thereof, that is used to transmit and/or receive data using network infrastructure. Sender 402 may refer to a computing entity that transmits multimedia content (e.g., multimedia stream) to receiver 404 via a network backbone.

Receiver 404 may refer to a second computing entity, and may furthermore be implemented in accordance with various computing entities described throughout this disclosure, such as those discussed in connection with FIG. 1-3 or 5-8. Receiver 404 may be a machine or set of several machines operating in conjunction with each other. For example, receiver 404 may receive messages (e.g., transmitted by sender 402) using various protocols including but not limited to: UDP, TCP, DCCP, SCTP, QUIC, RSVP, and more. Receiver 404 may refer to a computing entity that receives multimedia content (e.g., multimedia stream) transmitted by sender 402 to receiver 404 via a network backbone.

In various embodiments, sender 402 transmits a first message 406 comprising content to receiver 404 as data packets. An example of a data packet is a UDP datagram that includes multimedia content in its data field. In various embodiments, first message 406 comprising content is not successfully delivered to receiver 404. Data packet loss may arise where first message 406 comprising content is routed over a network path that is subject to adverse conditions. For the sake of example, first message 406 comprising content is illustrated as being transmitted over port 1234. Port 1234 is depicted as an illustrative example and other port numbers may be used in place of those depicted in FIG. 4 to implement various systems. The network path selected for routing first message 406 comprising content from sender 402 to receiver 404 may be selected based on the port over which first message 406 comprising content is being sent. The port may have been chosen for sending first message 406 comprising content in any suitable manner—for example, network conditions may have been probed at an earlier point in time and the port was determined to have high reliability at some point in the past, but a recent adverse condition may affect network traffic being routed over the network path associated with port 1234.

Continuing with this illustrative example, sender 402 may determine that a message (e.g., data packet) sent over a first port (e.g., port 1234 shown in FIG. 4) was not successfully received by receiver 404 and that data packet loss has occurred. In some embodiments, sender 402 determines that packet loss occurred based on a negative acknowledgement (NACK 408) being sent by receiver 404. In at least one embodiment, sender 402 sends a continuous stream of multimedia content to receiver 404 and receiver 404 may receive such content in datagrams. Receiver 404 may receive $Content_1$, $Content_2$, ... $Content_i$, and then fail to receive $Content_j$ within a maximum round trip time. Having received $Content_i$, receiver 404 may expect to receive $Content_j$ shortly thereafter. However, upon not receiving $Content_j$ in time, receiver 404 may send a negative acknowledgement NACK to sender 402 indicating that $Content_j$ was not received in time. In some embodiments, sender 402 determines that first message 406 comprising content was not successfully sent based on not having received a positive acknowledgement within a maximum round trip time for sending a datagram to receiver 404 and receiving an ACK for the datagram.

Sender 402 may determine that packet loss was associated with transmission of first message 406 comprising content and that the content should be retransmitted. Sender 402 may use network reliability metrics 410 to determine a second port for retransmission of the content.

In various embodiments, network reliability metrics 410 refers to a table comprising metrics collected regarding the availability and/or reliability of various ports which sender 402 may use to facilitate network communications with receiver 404. Network reliability metrics 410 may be collected based on metrics collected from probe packets, data packets, and any other suitable communications between sender 402 and receiver 404 that may be used to determine reliability of various network paths that may be used to route messages from sender 402 to receiver 404 in dynamically changing network environments. In at least one embodiment, network reliability metrics includes a plurality of rows, wherein each row encodes: a port corresponding to a network path used for network communications between sender 402 and receiver 404; a timestamp of the last message that was transmitted from sender 402 to receiver 404 that was successfully ACK'd over the port; and a running tally of the current number of successful ACK's received over the port. Various network reliability metrics, such as those discussed in connection with FIG. 3, may be included in network reliability metrics 410.

In at least one embodiment, $content_j$ may be retransmitted in a second message 412 over a second port (e.g., port 3456 depicted in FIG. 4) that is selected based on network reliability metrics 410. Second message 412 may encode the same sender address, destination port, destination address, and protocol as first message 406 but has a different sender port (e.g., port 1234 vs. port 3456). The sender port for second message may be selected as (1) the source port that has the longest consecutive duration without packet loss and (2) which has received an ACK for a packet that was sent more recently than when the packet to be retried was first sent. FIG. 4 depicts an illustrative example in which the message to be retried is initially transmitted at 2021-05-22T17:31:03.711Z (hereinafter referred to as 03.711Z). FIG. 4 further illustrates that ACKs were received on three ports for packets that were sent more recently than when the packet to be retried was first sent (e.g., 03.711Z)-port 4567 (03.718Z), 2345 (03.808Z), and 3456 (03.716Z) were all sent more recently than when the packet to be retried was first sent. Of these three candidate ports, the port with the longest consecutive duration without packet loss. As seen in FIG. 4, among these three candidate ports, port 3456 has the longest consecutive success duration (64.1 seconds). Note also that while other ports have longer consecutive success durations (e.g., port 5432 has success duration of 91.8 seconds) they do not satisfy criterion (1) and therefore are not candidate ports. The relative timing of various network communications depicted in FIG. 4 are summarized below:

| Time | Description |
| --- | --- |
| 2021-05-22T17:31:03.818Z | Last Successful Tx Over Port 4567 |
| 2021-05-22T17:31:03.808Z | Last Successful Tx Over Port 2345 |
| 2021-05-22T17:31:03.716Z | Last Successful Tx Over Port 3456 |
| 2021-05-22T17:31:03.711Z | Initial Transmission of $Content_j$ (NACK'd) |
| 2021-05-22T17:31:03.627Z | Last Successful Tx Over Port 5432 |
| 2021-05-22T17:31:03.524Z | Last Successful Tx Over Port 6543 |

Upon selection of a candidate port, sender 402 may send second message 412 over the selected port. Message 412 may comprise the same data payload as first message 406, but encodes a different 5-tuple and maps to a different network path. Accordingly, second message 412 may be used to retransmitted $content_j$ over a more reliable network path and may be successfully received by receiver 404—for example, sending $content_j$ over port 3456 may avoid adverse network conditions affecting nodes that caused the loss of the first message 406.

Figure 5:
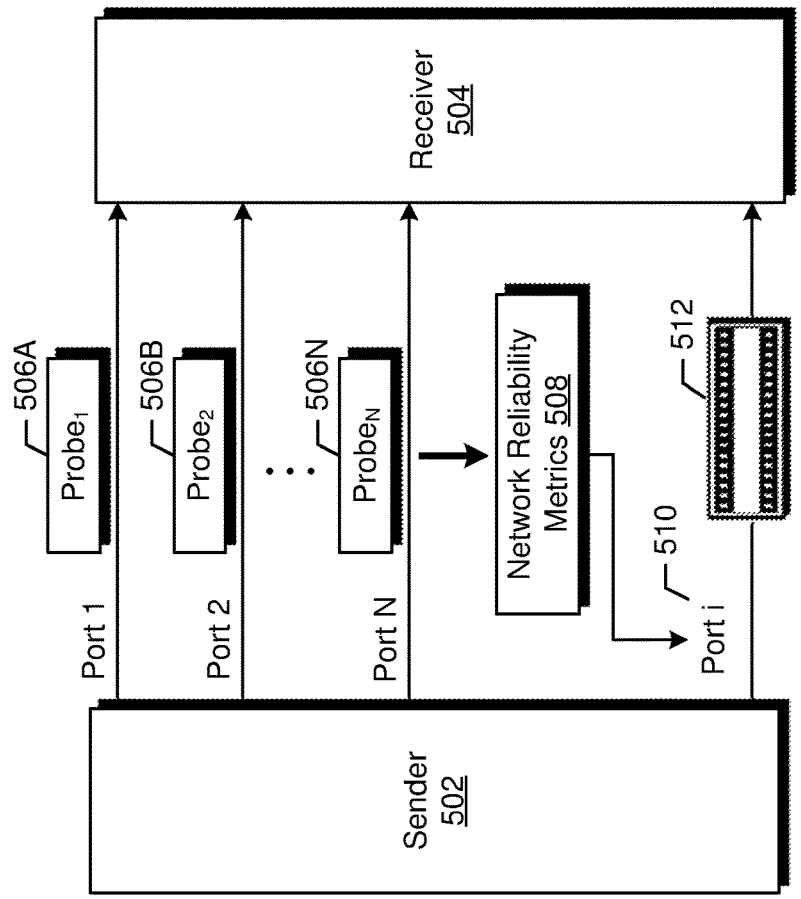
FIG. 5 illustrates a computing environment in which data is retransmitted based on network reliability metrics, in accordance with one or more example embodiments of the present disclosure.

FIG. 5 illustrates a computing environment 500 in which data is retransmitted based on network reliability metrics, in accordance with one or more example embodiments of the present disclosure. In at least one embodiment, sender 502 transmits data to a receiver 504 using network infrastructure that may be subject to adverse network conditions.

Sender 502 may refer to a first computing entity, and may furthermore be implemented in accordance with various computing entities described throughout this disclosure, such as those discussed in connection with FIG. 1-3 or 5-8. Sender 502 may be a machine or set of several machines operating in conjunction with each other. In various embodiments, sender 502 comprises network interface implemented as hardware, software, or a combination thereof, that is used to transmit and/or receive data using network infrastructure. Sender 502 may refer to a computing entity that transmits multimedia content (e.g., multimedia stream) to receiver 504 via a network backbone.

Receiver 504 may refer to a second computing entity, and may furthermore be implemented in accordance with various computing entities described throughout this disclosure, such as those discussed in connection with FIG. 1-3 or 5-8. Receiver 504 may be a machine or set of several machines operating in conjunction with each other. For example, receiver 504 may receive messages (e.g., transmitted by sender 502) using various protocols including but not limited to: UDP, TCP, DCCP, SCTP, QUIC, RSVP, and more. Receiver 504 may refer to a computing entity that receives multimedia content (e.g., multimedia stream) transmitted by sender 502 to receiver 504 via a network backbone.

In at least one embodiment, sender 502 sends probe packets to receiver 504. A probe packet may refer to a message that is transmitted from sender 502 to receiver 504 that is used for measuring network reliability metrics and does not carry content (e.g., multimedia stream). Sender 502 may send n unique 5-tuple probe streams to receiver 504 on a periodic schedule of every m milliseconds. The probe packets may be transmitted at a bitrate that is tuned independently of the bitrate of the content stream. For example, the frequency at which probe packets are sent may be directly proportional to the amount of packet loss measured by sender 502—for example, when network conditions are less reliable (e.g., greater rates of packet loss), the frequency at which probe packets are sent is increased to more quickly and more frequently identify reliable network paths in response to higher rates of packet loss. In some embodiments, the frequency at which probe packets are sent may be directly proportional to the rate of change in packet loss measured by sender 502—for example, when network conditions worsen (e.g., an increase in the rate of packet loss), the frequency at which probe packets are sent is increased to more quickly and more frequently identify reliable network paths based on detecting that network conditions are degrading.

Sender 502 may select or otherwise determine a set of ports to probe. In various embodiments, ports to probe may include some or all ports that may be used for transmitting content to receiver 504. In some embodiments, N ports out of a large set of possible port numbers are randomly or pseudo-randomly selected. In some embodiments, N ports corresponding to N unique network paths are selected (e.g., ports are selected such that there are no hash collisions).

Probe streams may be provisioned such that sender 502 sends a first probe packet 506A over a first port. A probe packet may refer to a packet that does not include content data (e.g., multimedia stream 512) but rather, is used for probing and to determine network reliability. In some embodiments, a probe packet is implemented as a UDP datagram. In some embodiments, a data field of a probe packet comprises a list of the N ports that are being probed. The list of the ports being probed may be used by receiver 504 to determine which ports it should expect to receive probe packets for. Because probe streams are being sent every m milliseconds, receiver 504 will know if a probe packet is late or missing and to send a NACK if such probe packets are not received or not received within the expected time window, according to at least one embodiment.

A second probe packet 506B may be sent over a second port, a third probe packet may be sent over a third port and so on. Probe packets 506A-N may be continuously probed so that the network conditions ascertained by the probes remain fresh and a reliable indicator of network reliability over the various network paths that may be utilized for routing data between sender 502 to receiver 504.

In various embodiments, receiver 504 receives one or more probe packets and sends acknowledgments (e.g., ACKs) back to the sender 502 confirming receipt of the probe packets. The quantity of ACKs should match the quantity of initial probe streams. In some embodiments, each ACK packet includes all of the ACK data for all of the streams, so that sender 502 will have ample opportunity to obtain the requisite information regarding which probe paths are functioning properly.

Accordingly, sender 502 and receiver 504 can establish a probing schedule or protocol to establish when probe packets are sent and when they are expected to be received. Sender 502 sends probe packets every m milliseconds (or as scheduled) across N ports and receiver 504 monitors the N ports and sends ACKs when packets are received or NACKs when packets are not received or not received in time. In this way, both sender 502 and receiver 504 mutually determine that which network paths (e.g., as determined based on the tuples of the probe packets) are operable and which network paths are inoperable.

Probe packets 506A-N, corresponding ACKs and NACKs, and other information may be used to determine network reliability metrics 508. Sender 502 may store network reliability metrics as a table or a suitable data structure such as a vector, list, queue, stack, array, map, and more. Network reliability metrics 508 collected from probe packets 506A-N may include any suitable metrics and combinations thereof, such as those discussed in connection with FIGS. 1-4 and 6-8.

Network reliability metrics 508 may be used to identify which ports and corresponding network paths are operating properly and to select ports for delivering content. For example, a port 510 may be selected by inspecting network reliability metrics and selecting the port that has the longest and/or most consecutive successful ACKs. In some embodiments, network reliability metrics 508 are used to measure the recent reliability rate (e.g., # of successful transmissions over a port divided by # of total transmissions over the port, over a recent time span) and the port with the highest reliability rate is selected. The selected port 510 may be used to transmit one or more messages comprising data content such as multimedia stream 512.

In some embodiments, port 510 is selected at a first time to transmit a stream of UDP datagrams to provide multimedia stream 512 to receiver 504. After the first time, network connectivity issues may cause packet loss of multimedia stream content. Network reliability metrics 508 may be used to select a different port (e.g., port j instead of port i) for transmission of the multimedia stream 512. In some embodiments, probe streams are continuously being sent concurrently with the transmission of the multimedia stream and network reliability metrics 508 include an accurate, up-to-date picture of the current network conditions for updating the data port. In some embodiments, probing is halted after a port 510 is selected, and then probing is again performed to identify a new port when there is a failure on port 510 or if sender 502 otherwise determines a new port should be used for transmitting multimedia stream content.

Variations on the techniques described above may include identifying K ports that meet a threshold level of reliability (e.g., 99.9% reliability over the past hour and no lost packets within the most recent minute) and transmitting data packets for multimedia stream 512 over the K ports in a round-robin or random fashion. Sending data packets over K ports (e.g., K network paths) rather than a single port may provide for more resilience against a single point of failure.

Figure 6:
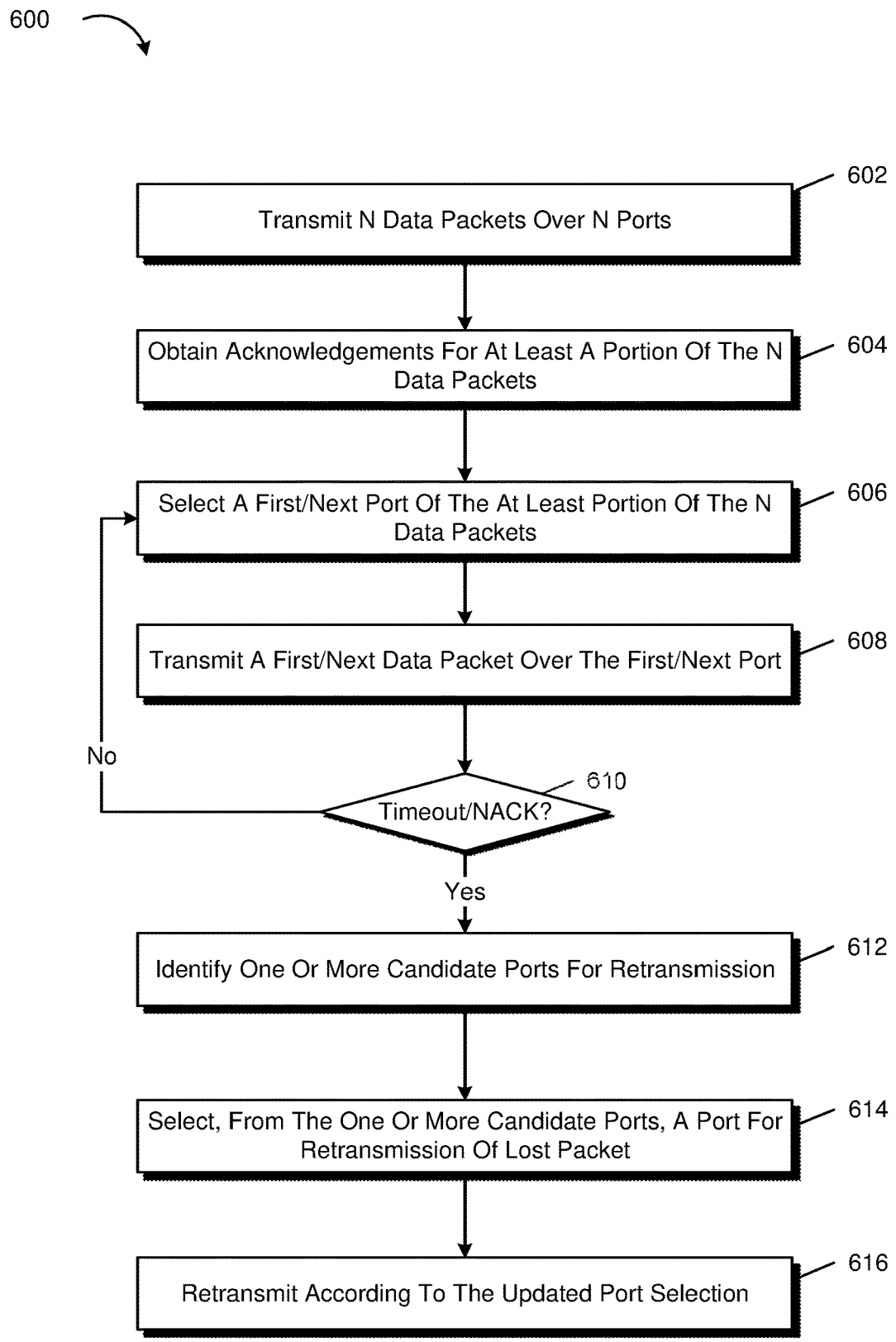
FIG. 6 shows an illustrative example of a process for probing network conditions and improving the reliability of network communications between computing entities, in accordance with one or more example embodiments of the present disclosure.

FIG. 6 shows an illustrative example of a process 600 for probing network conditions and improving the reliability of network communications between computing entities, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1-5 and 8. In at least one embodiment, process 600 or a portion thereof is implemented by a multimedia streaming service.

In at least one embodiment process 600 comprises a step to transmit 602 N data packets over N ports. For example, a sender computing entity transmits a first data packet comprising first content to a receiver computing entity using a first sender port, transmits a second data packet comprising second content to the receiver computing entity using a second sender port, and so on. The data packet may be a UDP datagram that encodes a tuple of UDP header information and a data field that encodes content (e.g., segment of a multimedia stream or portion thereof). A tuple of information may, for example, be a 5-tuple comprising {source port; source address; destination port; destination address; protocol. A tuple may be encoded or otherwise formatted to be an input to a one-way function (e.g., cryptographic hash function) that produces an output, and the output is mapped to a network path which is used to transmit messages with such header information from the sender to the destination (e.g., from sender computing entity to receiver computing entity). The data packets may be transmitted over the N ports in a round-robin fashion.

In at least one embodiment, process 600 comprises a step to obtain 604 acknowledgements for at least a portion of the N data packets. An acknowledgement may be obtained in any suitable manner—for example, an ACK may be received by a first computing entity in response to a data packet that was successfully received by a second computing entity. The acknowledgement may include information that identifies the successfully received packet, such as a sequence number. Data packets may be subject to a maximum round trip time wherein the acknowledgements must be received within the maximum round trip time to be treated as having been successfully transmitted. In some embodiments, if ACKs are not received for one or more of the N ports or not received in time, then those ports may be excluded from further use in transmitting subsequent data packets. As ACKs and NACKs are received by the sender, network reliability metrics may be recorded. In some cases, transmission of all N data packets to the intended recipient may fail, and the system may proceed with process 600 and select a first port at random. The case in which data loss occurred over all N ports may be likened to the case where all ports succeeded, in the sense that such information does not provide any additional information that would favor the selection of one port over another for subsequent transmissions.

In at least one embodiment, process 600 comprises a step to select 606 as a first port. The first port may be selected from the N port, exclusive of any ports that failed to successfully transmit data packets in steps 602-604. Port selection may be performed in any suitable manner. For example, a round-robin schedule may be to select the first port wherein if the first N data packets were transmitted over ports 1, 2, ... N, then the N+1$^{th}$ data packet (e.g., the first data packet of step 606) is sent over ports, N+2$^{th}$ data packet is sent over port$_2$, and so on (assuming no failure on those ports).

In at least one embodiment, process 600 comprises a step to transmit 608 the first data packet comprising first content over the first port. The selected port may be a sender port that is encoded in the header of a message, such as a UDP header. As discussed above, a tuple of information comprising the sender port may be used to determine the network path over which a message that encodes said tuple will be routed. Again, as noted above, the first port is selected based at least in part on successfully receiving an ACK at step 604 for a message that was transmitted over the first port at step 602.

In at least one embodiment, process 600 comprises a step to determine whether 610 the first data packet was lost. For example, a timeout or NACK may indicate failure of the transmission of the first data packet. Successful transmission of the first data packet may be determined based at least in part on receiving an ACK for the first data packet. If the first packet was successfully transmitted, the system may continue by selecting a second port, transmitting a second data packet comprising second content over the second port, and so on. The content may be multimedia content. However, if the first data packet was not successfully transmitted, it may be considered a lost packet and a retry may be performed.

In at least one embodiment, a retry according to process 600 comprises a step to identify 612 one or more candidate ports. A candidate port may refer to a port that was used to transmit a data packet after the initial transmission of the lost packet and was successfully ACK'd. This determination may be made using network reliability metrics, which may be continuously collected as packets (e.g., data packets and/or probe packets) are being transmitted over the N ports or a portion thereof. In at least one embodiment, a table is sorted to identify the most recent message for each port that was successfully acknowledged and identifying the associated ports for such messages as candidate ports. In some embodiments, if no candidate ports are identified, other network reliability metrics such as recent reliability or success streak may be used to identify one or more suitable candidate ports.

In at least one embodiment, process 600 comprises a step to select 614 a port from the one or more candidate ports with the longest consecutive duration without packet loss. The selected port may be used for retransmission of the lost packet. The selection may be made in any suitable manner. For example, the port for retransmission may be selected as the candidate ports with the longest consecutive duration without packet loss, with the most consecutive successful transmits, with the highest successful transmit rate, and so on. Metrics used to select a retransmission port may be time bound to a recent time window (e.g., past 10 seconds) so that the reliability metrics reflect current—rather than historical—network conditions. A retransmission port may be selected deterministically (e.g., as discussed above) or probabilistically. For example, candidate ports may be selected proportionally based on how many consecutive successful transmits each candidate port has over a recent time window. As an illustrative example, if candidate port A has successfully transmitted 100 consecutive packets over the time internal being examined and candidate port B has successfully transmitted 50 consecutive packets, then candidate port A may be selected 100/(100+50)=2/3 of the time and candidate port B may be selected 50/(100+50)=1/3 of the time.

In at least one embodiment, process 600 comprises a step to retransmit 616 according to the updated port selection. A retransmission may be performed over the selected candidate port. A data packet for retransmission may include the same data payload as the lost data packet but use a different sender port that causes the retransmitted packet to exercise a different network path from the lost packet. In at least some embodiments, multiple retries may be performed if a first retransmission fails, then a second retransmission (e.g., over a different port) may be attempted, and so on, until the data content is successfully transmitted or until a buffer duration is exhausted.

Figure 7:
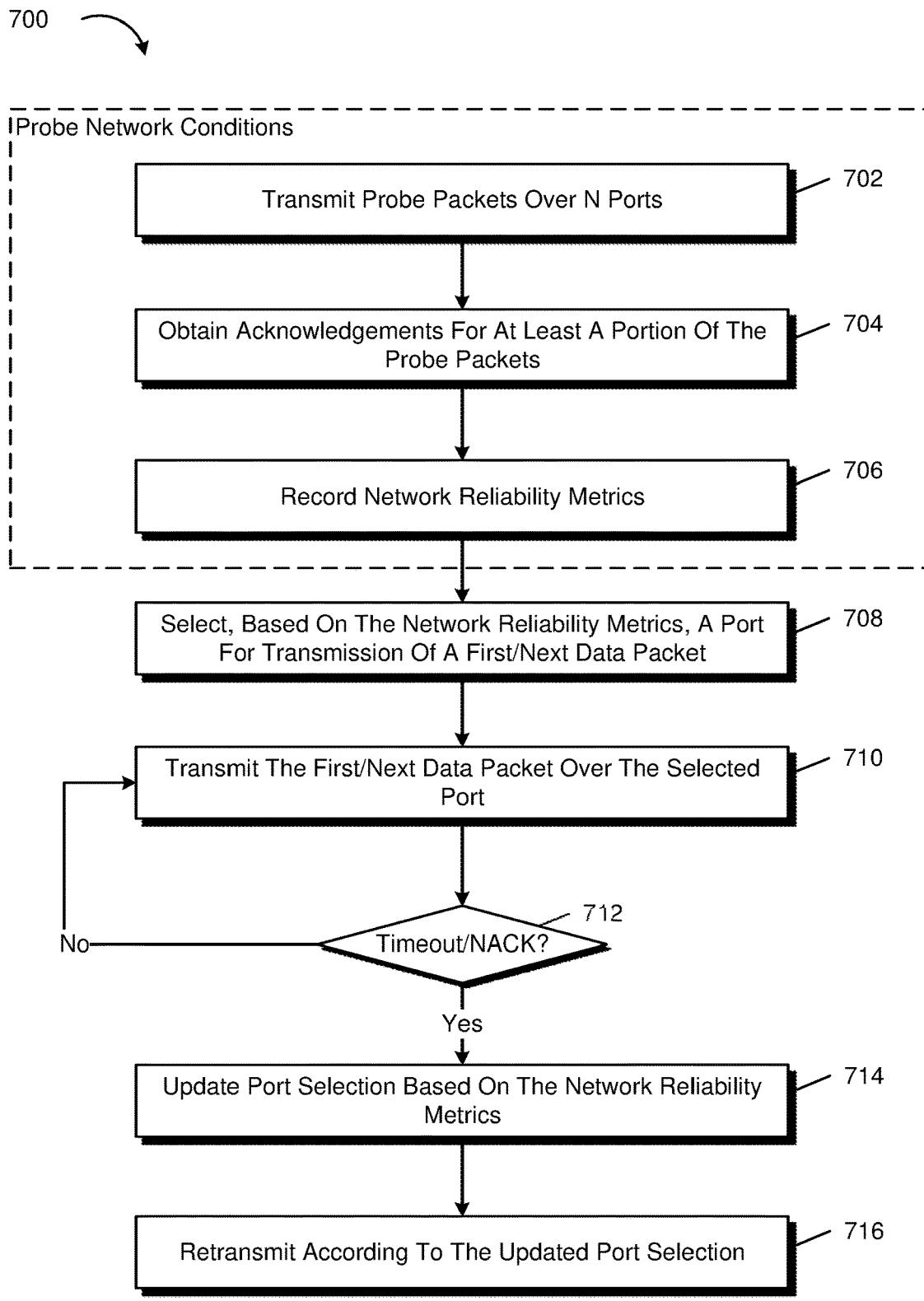
FIG. 7 shows an illustrative example of a process for probing network conditions and improving the reliability of network communications between computing entities, in accordance with one or more example embodiments of the present disclosure.

FIG. 7 shows an illustrative example of a process 700 for probing network conditions and improving the reliability of network communications between computing entities, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1-5 and 8. In at least one embodiment, process 700 or a portion thereof is implemented by a multimedia streaming service.

In at least one embodiment, process 700 comprises a step to transmit 702 probe packets over N ports. A probe packet may include information that is used by a sender and receiver to determine current network conditions, and may be in contrast to a data packet that encodes content that is intended for use by a receiver or a downstream entity, such as multimedia content. In at least one embodiment, each probe packet encodes the set of N ports that are being exercised to probe the network conditions. In at least one embodiment, the inclusion of the list of ports being probed allows for the receiver to determine whether a packet was not received and to transmit a NACK to indicate a failure over that port.

In at least one embodiment, process 700 comprises a step to obtain 704 acknowledgements for at least a portion of the probe packets. In at least some embodiments, a second computing entity receives probe packets over at least some of the N ports and transmits acknowledgements (e.g., ACKs) in response. ACKs may be transmitted over various ports and/or network paths and do not necessarily need to be ACK'd over the same network path as the message being acknowledged. In some embodiments, an ACK carries acknowledgement data for all N ports being probed. In this way, the sender computing entity (e.g., system performing process 700) has ample time to determine which probe paths are functioning. In at least some embodiments, one or more negative acknowledgements (e.g., NACKs) are received, indicating that a probe packet was not successfully received. In some cases, transmission of all N probe packets to the intended recipient may fail, and the system may proceed with process 600 and select a first port at random. The case in which data loss occurred over all N ports may be likened to the case where all ports succeeded, in the sense that such information does not provide any additional information that would favor the selection of one port over another for the transmissions of data packets.

In at least one embodiment, process 700 comprises a step to record 706 network reliability metrics. Network reliability metrics may be collected by a system on a per-port basis. Each port may be associated with a different network path (except for potential hash collisions). In some embodiments, collected network reliability metrics include, for each port, when probe packets are sent; when they are successfully acknowledged, when packets are lost; consecutive up-time duration for the port; consecutive down-time duration for the port; successful transmits streak; failed transmits streak; and combinations/derivations thereof. In at least some embodiments, network reliability metrics are measured for a recent time window (e.g., past X seconds).

In at least one embodiment, network conditions are probed according to steps 702-706 and may be continuously probed throughout process 700, concurrent with the transmission of data packets. In some embodiments, probe packets are sent as part of an initial discovery phase to identify one or more reliable ports for transmitting data content. In some embodiments, probing is performed based on network conditions—for example, if network reliability (e.g., as measured by rate of lost packets, rate of change of lost packets, etc.) is above a threshold, then probing is halted; but if the measured network reliability is below the threshold, then probing may be initiated or re-initiated due to the potential need to find a new port for the data content due to poor network conditions. In some embodiments, the rate at which probe packets are sent is tuned based on measured network reliability—for example, as the rate of lost packets or rate of change of lost packets increases, the rate at which probes are sent is increased. The probe rate may be directly proportional to an error rate and/or inversely proportional to a success rate. Probing techniques described in connection with FIG. 5 may be utilized in connection with process 700.

In at least one embodiment, process 700 comprises a step to select 708, based on the network reliability metrics, a port for transmission of a first data packet. The port may be selected in any suitable manner using one or more collected network reliability metrics. In at least one embodiment, N ports are probed to determine network reliability metrics (e.g., 100 probe packets sent to each port to determine rates of success for each port). Various criteria may be used to select the port for transmission of data content, such as the fastest port, most reliable port, etc.

In at least one embodiment, process 700 comprises a step to transmit 710 the first data packet over the selected port. Data packets may be transmitted over one port, a plurality of ports in a round-robin fashion, etc. The selected port may be used as the sender port for the first data packet. The first data packet may encode first content (e.g., of a multimedia stream). The first data packet may be a UDP datagram. The data packet may be a UDP datagram that encodes a tuple of UDP header information and a data field that encodes content (e.g., segment of a multimedia stream or portion thereof). A tuple of information may, for example, be a 5-tuple comprising {source port; source address; destination port; destination address; protocol. A tuple may be encoded or otherwise formatted to be an input to a one-way function (e.g., cryptographic hash function) that produces an output, and the output is mapped to a network path which is used to transmit messages with such header information from the sender to the destination (e.g., from sender computing entity to receiver computing entity).

In at least one embodiment, process 700 comprises a step to determine whether 712 the first data packet was lost. For example, a timeout or NACK may indicate failure of the transmission of the first data packet. If the first data packet was successfully transmitted, then a second data packet comprising second content (e.g., successive to the first content) may be transmitted over the selected port. In some embodiments, multiple ports are selected for transmission of data packets and a port of the multiple ports may be selected in any suitable manner—for example, in a round-robin fashion, randomly or pseudo-randomly (e.g., weighted based on reliability metrics of the multiple ports), and more. However, if transmission of the first data packet was not successful (e.g., NACK'd or no ACK received within maximum round trip time), then a retransmission of the lost data packet may be made using an updated port to exercise a different network path.

It is furthermore noted that in some embodiments, that the port selection for data transmissions may, in some cases, be updated even when a data packet is successful. For example, in some embodiments, network reliability metrics are continuously collected via probe packets and may indicate that the reliability of a particular port has diminished (e.g., the port has dropped from 99.9% reliability to 50% reliability). In such cases, the port selection may be updated even if a data packet was successfully transmitted on the particular port mentioned above. Port selection may, accordingly, be updated based on changes to the network reliability metrics of a port in some embodiments. Network reliability metrics may be used in place of or in combination with the transmission status of data packets over the port to determine whether and/or how to select updated ports for transmission of subsequent packets, according to at least one embodiment of this disclosure.

In at least one embodiment, process 700 comprises a step to update 714 port selection based on the network reliability metrics. An updated port may be selected according to various techniques described in connection with FIGS. 1-6. In at least one embodiment, an updated port is selected as a port over which a probe packet was sent and successfully ACK'd after the initial transmission of the first data packet. If ACK's were received in such a manner over multiple ports, the multiple ports may be candidate ports, and a port may be selected from the candidate ports in any suitable manner, such as by selecting the port with the longest consecutive duration of successful ACKs, the most successful ACKs, most consecutive successful ACKs, and so on. The time window examined to select a port from the candidate ports may be a recent window.

In at least one embodiment, process 700 comprises a step to retransmit 716 according to the updated port selection. A retransmission may be performed over the selected candidate port. A data packet for retransmission may include the same data payload as the lost data packet but use a different sender port that causes the retransmitted packet to exercise a different network path from the lost packet. In at least some embodiments, multiple retries may be performed if a first retransmission fails, then a second retransmission (e.g., over a different port) may be attempted, and so on, until the data content is successfully transmitted or until a buffer duration is exhausted.

One or more operations of the methods, process flows, or use cases of FIGS. 1-### may have been described above as being performed by a device, or more specifically, by one or more program module(s), applications, or the like executing on the device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations. For example, an illustrative device may be implemented according to and/or based at least in part on a device according to FIG. 8.

Pre-image resistant functions include one-way functions (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that $f(x)=y$ is below a specified threshold), second pre-image resistance (given an input $x_1$, the probability of randomly generating another input $x_2$, different from $x_1$, such that $f(x_1)=f(x_2)$ is below a specified threshold) and/or collision resistance (the probability of two different inputs resulting in the same output is less than a specified threshold). One-way functions suitable for use in generating an identifier for data include functions that satisfy properties of collision resistance (e.g., the probability of $f(x_1)=f(x_2)$ for different $x_1$ and $x_2$ is below a threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 8:
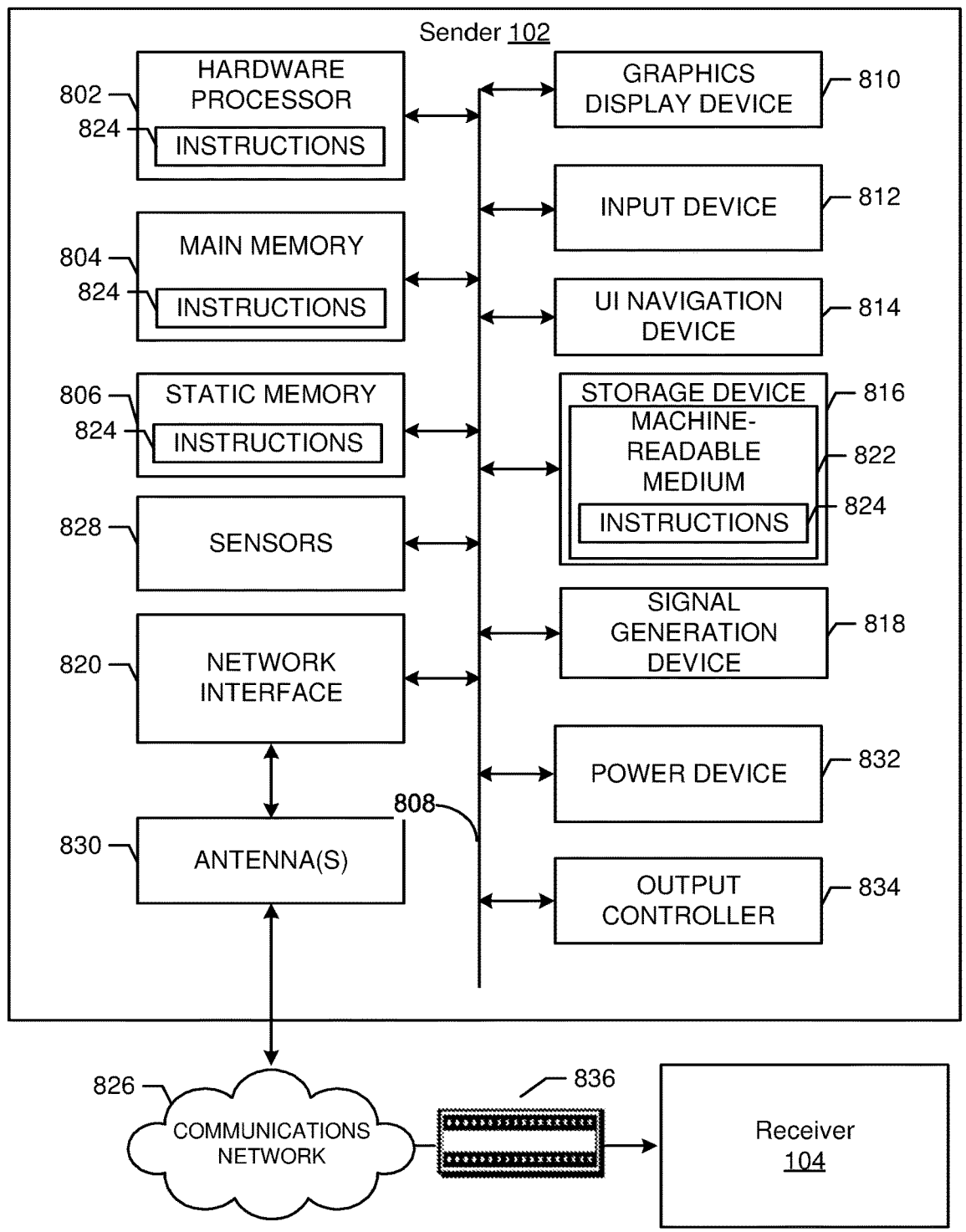
FIG. 8 illustrates a block diagram of an example machine upon which any of one or more techniques (e.g., methods) may be performed, in accordance with one or more example embodiments of the present disclosure.

FIG. 8 illustrates a block diagram of an example of a sender 102 computing entity (e.g., implemented in whole or in part in the context of embodiments described in connection with other figures. In some embodiments, the sender 102 computing entity may operate as a standalone device or may be connected (e.g., networked) to other machines. In a networked deployment, the sender 102 computing entity may operate in the capacity of a server machine, a client machine, or both in server-client network environments. In an example, the sender 102 computing entity may act as a peer machine in Wi-Fi direct, peer-to-peer (P2P) (or other distributed) network environments. The sender 102 computing entity may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include any combination of the illustrated components. For example, the sender 102 computing entity may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The sender 102 computing entity may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The sender 102 computing entity may additionally include a storage device (e.g., drive unit) 816, a signal generation device 818, and a network interface device/transceiver 820 coupled to antenna(s) 830. The sender 102 computing entity may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the sender 102 computing entity. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the sender 102 computing entity and that cause the sender 102 computing entity to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the sender 102 computing entity and includes digital or analog communications signals or other intangible media to facilitate communication of such software.

In at least one embodiment, sender 102 computing entity transmits content (e.g., multimedia content 836) to receiver 104 computing entity using techniques described herein, including techniques described in connection with FIGS. 1-7. Some or all techniques described in connection with FIGS. 1-7 may be implemented by sender 102 computing entity and/or receiver 104 computing entity. Receiver 104 computing entity may be an example of another sender 102 computing entity that receives multimedia content 836 from sender 102 computing entity and may use the multimedia content 836 in any suitable manner, for example, by forwarding it to other regional servers, serving the content to viewers, and so on. Sender 102 computing entity may be used to perform some or all functionality of sender computing entity and/or receiver computing entity described throughout this disclosure. While multimedia content 836 is illustrated in FIG. 8, it should be viewed as a non-limiting example of a specific type of content that may be communicated using techniques described in this disclosure.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Additionally, the phrase "based on" may be synonymous to "based at least in part on" rather than "based solely on" unless it is explicitly stated or clear from the context that the latter meaning is intended. Additionally, the various terms used throughout this disclosure may relate to various fields of mathematics, science, and/or engineering. These terms are to be interpreted according to their respective fields unless otherwise clear from the context in which they are being described. As a non-limiting example, the terms "proper subset" and "subset" are to be interpreted according to their definitions given in mathematical set theory, unless clearly indicated by the context.

Additionally, features of various system and methods described herein that are implemented "by" performing a step are to be construed or may be synonymous to "by at least" performing said step rather than "by solely" performing said step, unless it is explicitly stated or clear from the context. For example, a system that implements specific features "by" performing a particular step may be described in a manner that is not exclusive of the performance of other steps, some of which may be related to said particular step. In some cases, other steps may omitted from various discussions for the sake of clarity.

What is claimed is:

1. A computer-implemented method, comprising:
   transmitting, by a first computing entity, a plurality of data packets over a plurality of ports to a second computing entity, wherein the plurality of data packets comprises a first data packet transmitted over a first port;
   obtaining, by the first computing entity, acknowledgements indicating the plurality of data packets was received by the second computing entity;
   transmitting, at a first time, a second data packet over the first port to the second computing entity;
   transmitting, subsequent to the first time and prior to a second time, one or more data packets over one or more ports of the plurality of ports;
   obtaining prior to the second time, one or more acknowledgements indicate receipt of the one or more packets by the second computing entity;
   determining, at the second time, a failure occurred in transmission of the second data packet over the first port;
   determining one or more network reliability metrics collected prior to the second time, the one or more reliability metrics including durations of lossless data packet transmission for the one or more ports;
   selecting the second port based on the second port's duration of lossless data packet transmission being highest among the one or more ports; and
   retransmitting content of the second data packet over the second port to the second computing entity.

2. The computer-implemented method of claim 1, wherein the first port is associated with a first network path to the second computing entity and the second port is associated with a second network path to the second computing entity.

3. The computer-implemented method of claim 1, wherein a hash of a portion of a header of the first data packet corresponds to the first network path, wherein the portion of the header comprises the first port.

4. The computer-implemented method of claim 1, further comprising obtaining, in response to the second data packet, an acknowledgement indicating receipt of the content by the second computing entity.

5. A system, comprising:
   one or more processors; and
   memory storing executable instructions that, as a result of execution by the one or more processors, cause the system to:
   transmit a plurality of messages over a plurality of ports to a second system;
   determine network reliability metrics for the plurality of ports;
   select, based on the network reliability metrics, a first port from the plurality of ports;
   transmit, at a first time, a first message over the first port to the second system, wherein the first message comprises content;
   determine additional network reliability metrics based on one or more communications sent subsequent to the first time and prior to a second time using a group of candidate ports;
   determine, at the second time, a transmission error of the first message;
   select a second port from the group of candidate ports for retransmission of the content, the second port having a longest consecutive duration without packet loss among the group of candidate ports; and
   transmit a second message over the second port to the second system, wherein the second message comprises the content.

6. The system of claim 5, wherein the instructions to select, based on the additional network reliability metrics, include instructions that, as a result of execution by the one or more processors, cause the system to:

identify the one or more candidate ports, wherein an acknowledgement was obtained on a candidate port for a message that was transmitted subsequent to the first time.

7. The system of claim 5, wherein:
the instructions to determine the network reliability metrics for the plurality of ports include instructions that, as a result of execution by the one or more processors, cause the system to:
obtain acknowledgements for a first portion of the plurality of messages; and
obtain negative acknowledgements for a second portion of the plurality of messages; and
wherein the second port is selected from the first portion of the plurality of messages.

8. The system of claim 5, wherein the first message is a User Datagram Protocol (UDP) datagram.

9. The system of claim 5, wherein:
the first message encodes a first tuple comprising:
the first port;
a sender address of the system;
a destination port of the second system;
a destination address of the second system; and
a protocol;
the second message encodes a second tuple comprising:
the second port;
the sender address of the system;
the destination port of the second system;
the destination address of the second system; and
the protocol; and
wherein a hash of the first tuple is associated with a first network path and the hash of the second tuple is associated with a second network path, wherein the first network path is different from the second network path.

10. The system of claim 5, wherein the plurality of messages encodes multimedia content.

11. A non-transitory computer-readable storage medium storing executable instructions that, as a result of being executed by one or more processors of a computer system, cause the computer system to at least:
transmit a plurality of messages to a second computer system over a plurality of network paths;
determine network reliability metrics for the plurality of network paths based on one or more results of transmitting the plurality of messages;
select, based on the network reliability metrics, a first network path for transmission of content to the second computer system;
transmit, at a first time, a first message to the second computer system, wherein the first message comprises:
the content; and
a first tuple of information that indicates the first message is associated with the first network path;
detect a failure in the transmission of the first message;
determine additional network reliability metrics subsequent to the first time and prior to detection of the failure in the transmission of the first message, the additional network reliability metrics based on one or more acknowledgements obtained by the computer system in response to one or more messages transmitted to the second computer system subsequent to the first time, wherein the one or more acknowledgements indicates that one or more network paths are working;
select a second network path from the one or more network paths based on duration of consecutive successful transmissions; and
transmit a second message to the second computer system, wherein the second message comprises:
the content; and
a second tuple of information that indicates the second message is associated with the second network path.

12. The non-transitory computer-readable storage medium of claim 11, wherein:
the first tuple of information comprises a first port; and
the first tuple of information is associated with the first network path based on a hash function that maps the first tuple of information to the first network path.

13. The non-transitory computer-readable storage medium of claim 12, wherein the first tuple of information is encoded in a header of the message.

14. The non-transitory computer-readable storage medium of claim 11, wherein the instructions to detect the failure in the transmission of the first message include instructions that, as a result of being executed by the one or more processors of the computer system, cause the computer system to detect a lack of an acknowledgement from the second computer system in response to the first message within a round trip time.

15. The non-transitory computer-readable storage medium of claim 11, wherein the instructions to detect the failure in the transmission of the first message include instructions that, as a result of being executed by the one or more processors of the computer system, cause the computer system to obtain a negative acknowledgement from the second computer system.

16. The non-transitory computer-readable storage medium of claim 11, wherein:
the plurality of messages are a plurality of probe packets transmitted at a first bitrate; and
the first message is a data packet and the content comprises multimedia content transmitted at a second bitrate.

17. The non-transitory computer-readable storage medium of claim 16, wherein the first bitrate is determined proportionally to a rate of packet loss measured over the plurality of network paths.

\* \* \* \* \*